(12) United States Patent
Takasu

(10) Patent No.: US 8,588,314 B2
(45) Date of Patent: Nov. 19, 2013

(54) COMMUNICATION DEVICE AND METHOD FOR DETECTING BROADCAST WAVE TO BE PERFORMED BY COMMUNICATION DEVICE

(75) Inventor: Shigeru Takasu, Tokyo (JP)

(73) Assignee: Sony Corporation (JP)

( * ) Notice: Subject to any disclaimer, the term of this patent is extended or adjusted under 35 U.S.C. 154(b) by 373 days.

(21) Appl. No.: 12/799,566

(22) Filed: Apr. 27, 2010

(65) Prior Publication Data

US 2010/0296590 A1  Nov. 25, 2010

(30) Foreign Application Priority Data

May 13, 2009  (JP) ............................... P2009-116549

(51) Int. Cl.
*H04B 3/00* (2006.01)

(52) U.S. Cl.
USPC ......................................... 375/257; 375/219

(58) Field of Classification Search
USPC ......................................... 375/219–225, 257
See application file for complete search history.

(56) References Cited

U.S. PATENT DOCUMENTS

| | | | |
|---|---|---|---|
| 2001/0038345 A1* | 11/2001 | Satoh et al. | 340/947 |
| 2007/0230377 A1* | 10/2007 | Nosaka et al. | 370/294 |
| 2009/0051534 A1* | 2/2009 | Aguirre et al. | 340/572.1 |
| 2009/0074044 A1* | 3/2009 | Yokomitsu et al. | 375/225 |
| 2011/0090067 A1* | 4/2011 | Kuroda et al. | 340/13.23 |
| 2011/0150105 A1* | 6/2011 | Koga et al. | 375/257 |

FOREIGN PATENT DOCUMENTS

JP  2007-028492 A  2/2007

* cited by examiner

*Primary Examiner* — Emmanuel Bayard
(74) *Attorney, Agent, or Firm* — Lerner, David, Littenberg, Krumholz & Mentlik, LLP

(57) ABSTRACT

A communication device includes a data communication unit that sends a communication signal, which is obtained by at least modulating transmission data, to a power line; a zero-crossing-point detector that detects a zero crossing point of an alternating voltage applied from the power line; a transmission unit that sends a coexistence signal to the power line in a coexistence region that starts at a time based on the zero crossing point, the coexistence signal having information for allowing systems to be present on the power line; a receiving unit that detects the coexistence signal from the power line in the coexistence region; a setting unit that sets a detection period for performing a detection operation for detecting a broadcast wave in accordance with the coexistence signal; and a broadcast-wave detector that detects a broadcast wave by performing frequency analysis on a signal on the power line in the detection period.

12 Claims, 11 Drawing Sheets

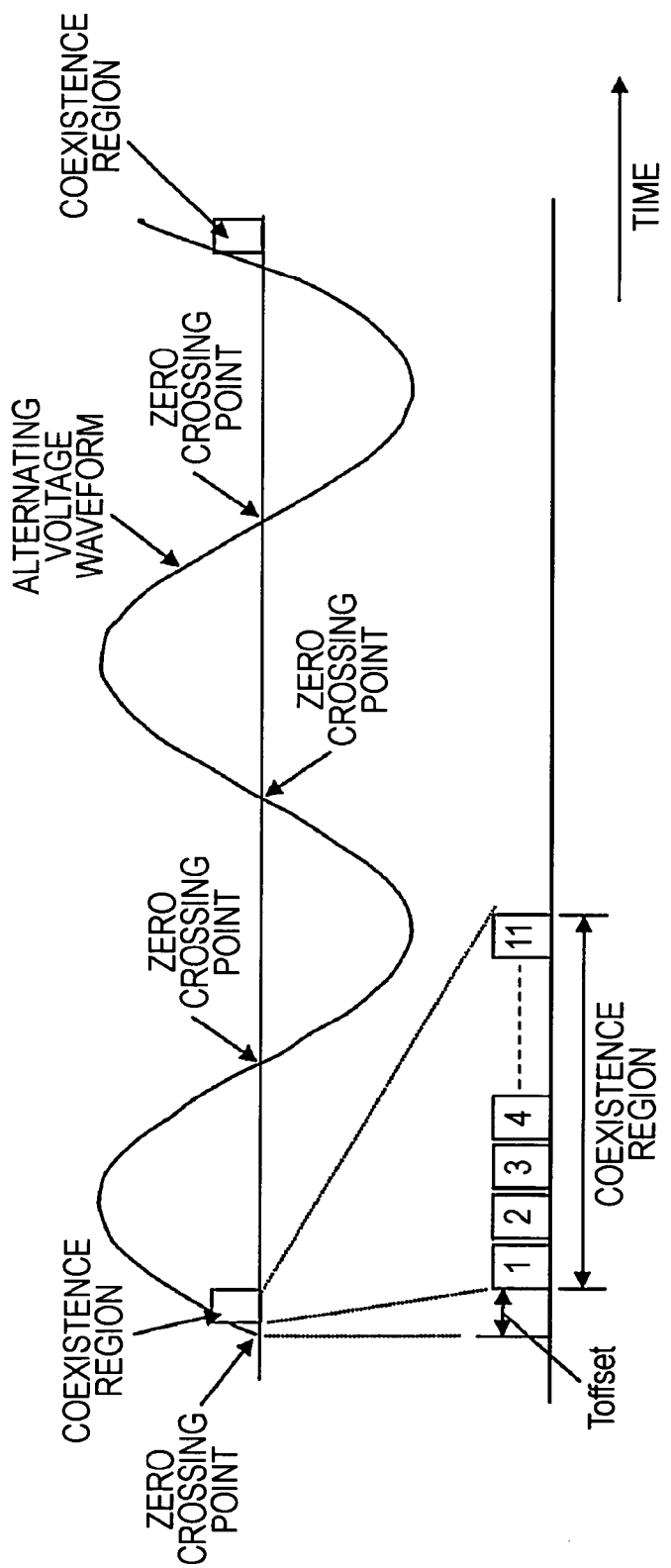

COMMUNICATION DEVICE AND METHOD FOR DETECTING BROADCAST WAVE TO BE PERFORMED BY COMMUNICATION DEVICE

CROSS-REFERENCE TO RELATED APPLICATION

The present application claims priority from Japanese Patent Application No. JP 2009-116549 filed in the Japanese Patent Office on May 13, 2009, the entire content of which is incorporated herein by reference.

BACKGROUND OF THE INVENTION

1. Field of the Invention

The present invention relates to a communication device and a method for detecting a broadcast wave to be performed by the communication device. More particularly, the present invention relates to a communication device and the like that perform communication using a power line from which an alternating voltage is applied.

2. Description of the Related Art

There is power line communication (PLC) for performing data communication via a power line from which an alternating voltage is applied. Such PLC is described in, for example, Japanese Unexamined Patent Application Publication No. 2007-28492.

In PLC, communication is performed by sending a high frequency communication signal via a power line. This communication signal is an orthogonal frequency division multiplexing (OFDM) modulation signal whose communication band is, for example, from 2 MHz to 30 MHz, and a plurality of carriers use up the entire communication band. Thus, a signal is radiated using the power line as an antenna, and interferes with short-wave broadcasting, which is received by someone. Thus, a method has been proposed in which a broadcast wave is detected and a notch is formed in a frequency band having a predetermined bandwidth in which the broadcast wave is included.

SUMMARY OF THE INVENTION

However, in a case in which different PLC systems are present on the same power line, even if one of the PLC systems stops sending a communication signal, another one of the PLC systems uses the frequency band of the power line to send a communication signal. Thus, there is a problem in that a broadcast wave whose signal level is smaller than or equal to that of the communication signal is not detected.

For example, FIG. 12 shows an exemplary spectrum, which covers from 6 MHz to 7 MHz, of a signal sent via a power line. Arrows P1 to P4 denote broadcast waves having certain frequency components. FIG. 13 shows a noise spectrum, which covers from 6 MHz to 7 MHz, when a communication signal is sent from a PLC system to the power line. FIG. 14 shows both the exemplary spectrum shown in FIG. 12 and the exemplary noise spectrum shown in FIG. 13. In the situation shown in FIG. 14, the signal level of noise caused by the communication signal sent from the PLC system exceeds that of the broadcast waves, whereby the broadcast waves are not detected. It is desired that a broadcast wave is detected, a notch is formed in a frequency band having a predetermined bandwidth in which the broadcast wave is included as shown in FIG. 15, and short-wave broadcasting is received by someone without interference.

Here, propagation of radio waves changes with time in short-wave broadcasting, whereby a station that a user has been unable to receive is received or vice versa. Thus, it is necessary to detect broadcast waves occasionally. There is a problem in that the efficiency of communication is reduced when communication is stopped to detect such broadcast waves.

It is desirable to detect a broadcast wave with high accuracy without reducing the efficiency of communication.

A communication device according to an embodiment of the present invention includes a data communication unit that sends a communication signal to a power line, the communication signal being obtained by at least modulating transmission data; a zero-crossing-point detector that detects a zero crossing point of an alternating voltage applied from the power line; a coexistence-signal transmission unit that sends a coexistence signal to the power line in a coexistence region that starts at a time based on the zero crossing point detected by the zero-crossing-point detector, the coexistence signal having information for allowing a plurality of systems to be present on the power line; a coexistence-signal receiving unit that detects the coexistence signal from the power line in the coexistence region; a detection-period setting unit that sets a detection period for performing a detection operation for detecting a broadcast wave in accordance with the coexistence signal detected by the coexistence-signal receiving unit; and a broadcast-wave detector that detects a broadcast wave by performing frequency analysis on a signal on the power line in the detection period set by the detection-period setting unit.

According to this embodiment of the present invention, the coexistence signal having information for allowing a plurality of systems to be present on the power line is sent to the power line or such a coexistence signal is detected from the power line in the coexistence region that starts at the time based on the zero crossing point of the alternating voltage applied from the power line. The detection-period setting unit sets the detection period in accordance with the coexistence signal detected from the power line. The broadcast-wave detector detects a broadcast wave by performing frequency analysis on the signal on the power line in this detection period. In the frequency analysis, for example, a digital filter may be used or fast Fourier transform (FFT) may be performed.

For example, the coexistence region may include a plurality of field areas. The detection-period setting unit may set a period during which no coexistence signal and no communication signal are present as the detection period in accordance with the presence or absence of the coexistence signal in each of the field areas.

For example, the field areas may include a first field area in which a coexistence signal can be present that is used to notify a system that does not synchronize with a subject system that the system should synchronize with the subject system. When no coexistence signal is present in the first field area, the period of the first field area may be set as the detection period.

For example, the field areas may include a first field area in which a coexistence signal can be present that is used to notify a system that does not synchronize with a subject system that the system should synchronize with the subject system. When a coexistence signal is present in the first field area, the period of a data region between the coexistence region and the next coexistence region may be set as the detection period.

For example, a data region between the coexistence region and the next coexistence region may include a plurality of slots that constitute a bandwidth-reservation data region. The field areas may include a plurality of second field areas, in each of which a coexistence signal can be present that indicates that a corresponding one of the slots that constitute the bandwidth-reservation data region is used. When the second field areas include a second field area in which no coexistence signal is present and that is in an idle state, the period of the second field area may be set as the detection period.

For example, when no system other than a subject system is present, a period that is not used by the subject system may be set as the detection period.

For example, a data region between the coexistence region and the next coexistence region may include a plurality of slots that constitute a best-effort data region. The field areas may include a plurality of third field areas in which a coexistence signal can be present that indicates which one of or which part of each of the slots that constitute the best-effort data region is used. When no coexistence signal is present in any of the third field areas, the period of the slots that constitute the best-effort data region may be set as the detection period.

For example, the field areas may include a fourth field area in which a coexistence signal is present when an access system is working. When no coexistence signal is present in the fourth field area, the period of the fourth field area may be set as the detection period.

As described above, a period during which no coexistence signal or no communication signal is present may be set as the detection period, whereby a broadcast wave can be detected with high accuracy without reducing the efficiency of communication.

For example, a data region between the coexistence region and the next coexistence region may include a plurality of slots that constitute the data region. The coexistence region may include a plurality of field areas including a field area in which a coexistence signal can be present that indicates that a slot from among the slots is used. In a case in which a subject system has reserved a slot from among the slots, the detection-period setting unit may set a time period of the slot during which the subject system is not using the slot as the detection period. In this case, even when a coexistence signal is present in all the field areas, a broadcast wave can be detected.

For example, when sending the communication signal to the power line, the data communication unit may reduce the level of a frequency component of a frequency band of the communication signal, the frequency band having a predetermined bandwidth in which the broadcast wave detected by the broadcast-wave detector is included. For example, a modulation scheme performed on the communication signal may be a multi-carrier modulation scheme. The data communication unit may make a subcarrier unavailable, the subcarrier having a frequency band having a predetermined bandwidth in which the broadcast wave detected by the broadcast-wave detector is included, to reduce the level of a frequency component of the frequency band having the predetermined bandwidth. As described above, the level of the frequency component of the frequency band having the predetermined bandwidth in which the broadcast wave is included is reduced, whereby the effects of communication signals on the broadcast wave can be prevented.

According to the embodiments of the present invention, the detection period for performing a detection operation for detecting a broadcast wave is set in accordance with the coexistence signal detected from the power line. For example, a period during which no coexistence signal or no communication signal is present is set as the detection period, whereby a broadcast wave can be detected with high accuracy without reducing the efficiency of communication.

BRIEF DESCRIPTION OF THE DRAWINGS

FIG. 4 is a diagram illustrating the relationship between zero crossing points of an alternating voltage and locations of coexistence regions;

DESCRIPTION OF THE PREFERRED EMBODIMENTS

In the following, embodiments of the present invention will be described. First, an embodiment of the present invention is described, and then modified embodiments are described.

Figure 1:
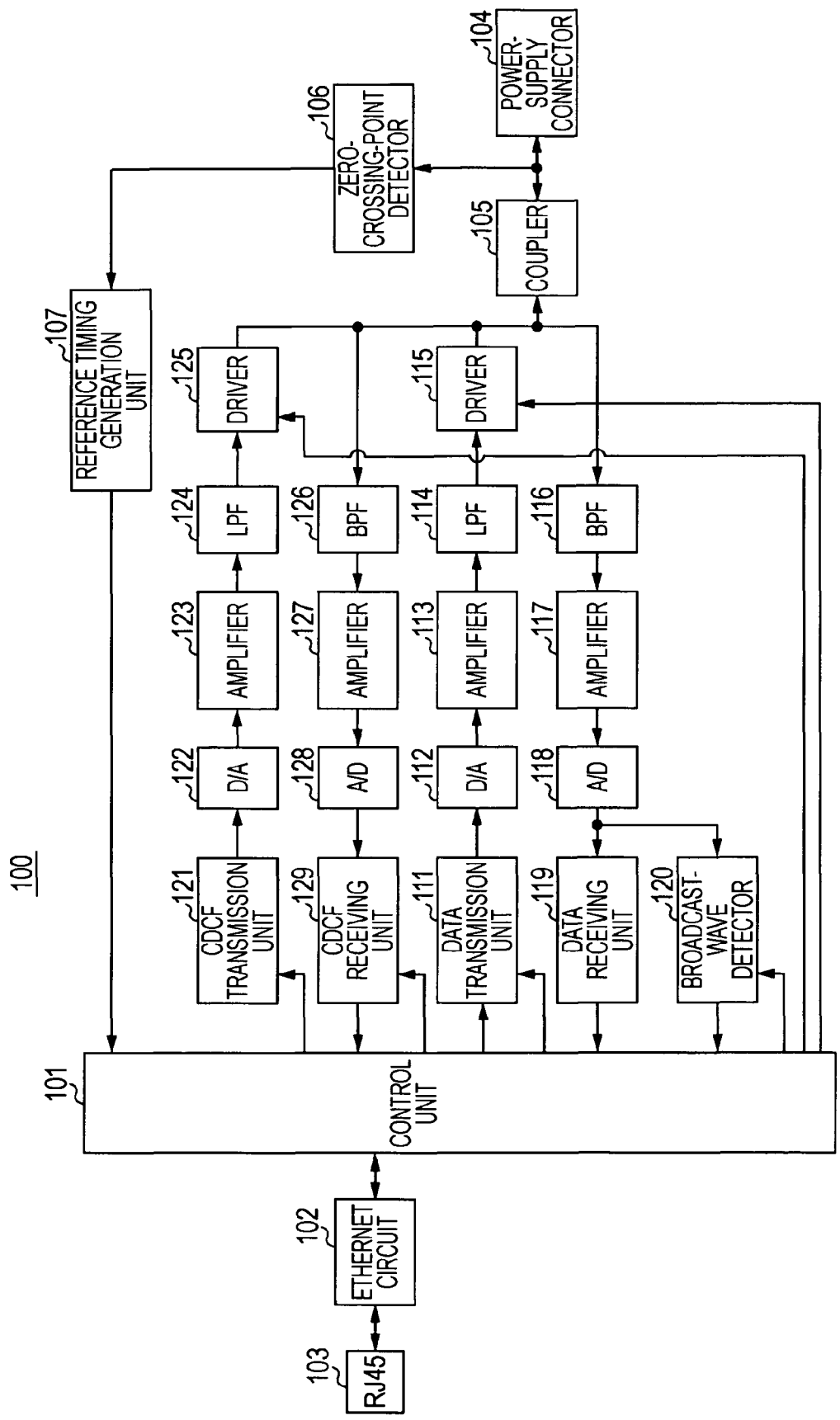
FIG. 1 is a block diagram of an exemplary structure of a PLC modem as an embodiment of the present invention.

FIG. 1 shows an exemplary structure of a PLC modem 100 as an embodiment of the present invention. This PLC modem 100 is a modem used to perform communication using power lines (lamp lines) intended for home use. The PLC modem 100 has a communication band from 2 MHz to 30 MHz, and uses orthogonal frequency division multiplexing (OFDM), which is a multi-carrier scheme, as a modulation scheme.

The PLC modem 100 includes a control unit 101, an Ethernet circuit 102, and an RJ45 connector 103. The PLC modem 100 also includes a power-supply connector 104, a coupler 105, a zero-crossing-point detector 106, and a reference timing generation unit 107.

Moreover, the PLC modem 100 includes a data transmission unit 111, a digital-to-analog (D/A) converter 112, an amplifier 113, a low pass filter (LPF) 114, a driver 115, a band pass filter (BPF) 116, an amplifier 117, an analog-to-digital (A/D) converter 118, a data receiving unit 119, and a broadcast-wave detector 120.

Moreover, the PLC modem 100 includes a commonly distributed coordination function (CDCF) transmission unit 121, a D/A converter 122, an amplifier 123, a LPF 124, a driver 125, a BPF 126, an amplifier 127, an A/D converter 128, and a CDCF receiving unit 129.

The control unit 101 includes a central processing unit (CPU), and controls operations of various units included in the PLC modem 100. FIG. 1 shows only part of control lines. The other control lines are omitted in FIG. 1.

The control unit 101 sends transmission data to the data transmission unit 111, and receives reception data from the data receiving unit 119. Moreover, the control unit 101 sends, to the Ethernet circuit 102, reception data destined for another device. Moreover, the control unit 101 receives, from the Ethernet circuit 102, transmission data transmitted from another device.

The RJ45 connector 103 is connected to the Ethernet circuit 102. The Ethernet circuit 102 relays data between another device connected to a network, which is not shown, and the control unit 101: transmission data transmitted from the device to the control unit 101 and reception data transmitted to the device from the control unit 101.

The power-supply connector 104 is a connector that is used to connect the PLC modem 100 to a power line, which is not shown. The coupler 105 is a filter circuit that prevents an alternating voltage (an alternator) having a low frequency of 50 Hz or 60 Hz from passing therethrough and allows a high frequency communication signal and a CDCF signal (a coexistence signal) to pass therethrough.

The zero-crossing-point detector 106 detects zero crossing points of an alternating voltage applied via the power-supply connector 104 from the power line. The reference timing generation unit 107 generates, in accordance with a signal indicating results of zero-crossing-point detection, a reference timing signal necessary for transmitting and receiving a CDCF signal, and supplies the reference timing signal to the control unit 101.

Figure 2:
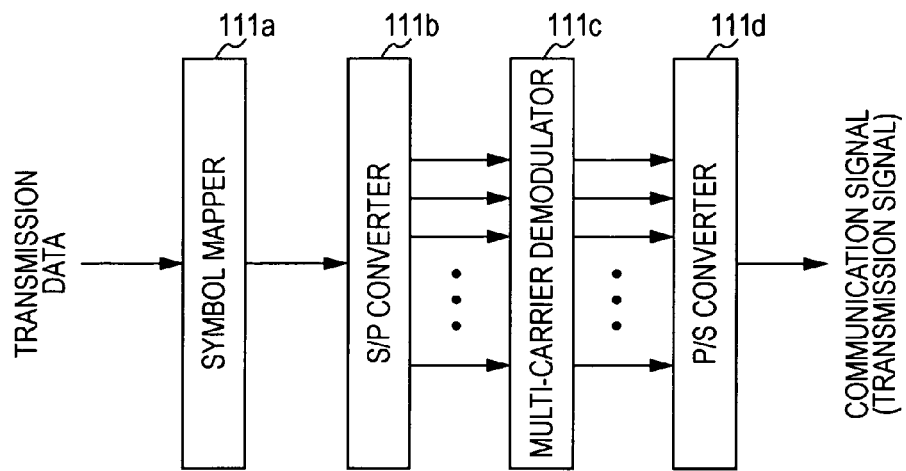
FIG. 2 is a block diagram illustrating an exemplary structure of a data transmission unit of the PLC modem.

The data transmission unit 111 performs OFDM modulation processing on transmission data supplied from the control unit 101, and generates and outputs a communication signal (a transmission signal) having a communication band from 2 MHz to 30 MHz. FIG. 2 shows an exemplary structure of the data transmission unit 111. The data transmission unit 111 includes a symbol mapper 111a, a serial-to-parallel (S/P) converter 111b, a multi-carrier demodulator 111c, and a parallel-to-serial (P/S) converter 111d.

The symbol mapper 111a converts bit data, which is transmission data, into symbol data, and performs symbol mapping (modulation such as Pulse-amplitude modulation (PAM) and Quadrature amplitude modulation (QAM)) onto a complex coordinate plane using the symbol data. The S/P converter 111b gives an actual value or a complex value to subcarriers individually. The multi-carrier demodulator 111c obtains a discrete multi-carrier signal by performing demodulation, generates sample values of a time-base waveform, and generates series of sample values representing transmission symbols. The P/S converter 111d converts the series of the sample values from parallel to serial to obtain a communication signal.

Referring back to FIG. 1, the D/A converter 112 converts the communication signal output from the data transmission unit 111 from a digital signal to an analog signal. The amplifier 113 amplifies the communication signal, which is an analog signal, output from the D/A converter 112. The LPF 114 limits the band of the communication signal amplified by the amplifier 113. When transmitting data under control performed by the control unit 101, the driver 115 sends the communication signal output from the LPF 114 to the power line via the coupler 105 and the power-supply connector 104.

The BPF 116 extracts a communication signal (a received signal) of 2 MHz to 30 MHz from the power line via the power-supply connector 104 and the coupler 105. The amplifier 117 amplifies the communication signal extracted by the BPF 116. The A/D converter 118 converts the communication signal amplified by the amplifier 117 from an analog signal to a digital signal. The data receiving unit 119 obtains reception data by performing OFDM demodulation processing on the communication signal, which is a digital signal, output from the A/D converter 118 and supplies the reception data to the control unit 101.

Figure 3:
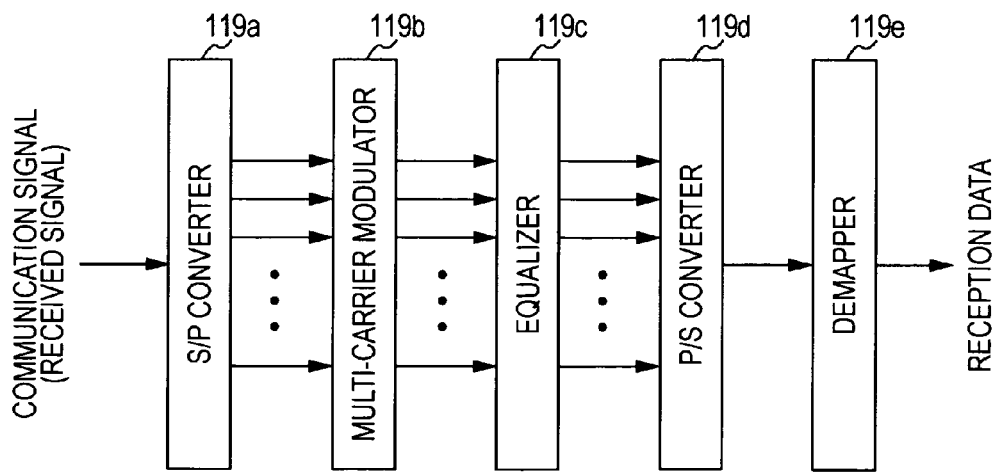
FIG. 3 is a block diagram illustrating an exemplary structure of a data receiving unit of the PLC modem.

FIG. 3 shows an exemplary structure of the data receiving unit 119. The data receiving unit 119 includes an S/P converter 119a, a multi-carrier modulator 119b, an equalizer 119c, a P/S converter 119d, and a demapper 119e.

The S/P converter 119a converts a series of sample values from serial to parallel. The multi-carrier modulator 119b performs discrete multi-carrier modulation in the frequency domain on the parallel sample-value streams. The equalizer 119c equalizes data of the resulting streams of channels using values necessary to perform equalization, the values being obtained by comparing data on the channels with given pieces of data that have been allocated to the channels in advance. The P/S converter 119d converts parallel data into serial data. The demapper 119e obtains reception data by performing processing reverse to processing performed by the symbol mapper 111a of the data transmission unit 111 shown in FIG. 2.

Referring back to FIG. 1, the CDCF transmission unit 121 outputs a CDCF signal under control performed by the control unit 101. There are several types of CDCF signal. As a CDCF signal, a specific subcarrier having, for example, a frequency within the communication band is used from among, for example, a plurality of subcarriers used for performing OFDM modulation.

The control unit 101 receives a reference timing signal from the reference timing generation unit 107. The control unit 101 sends a command to the CDCF transmission unit 121 as to which type of CDCF signal to select and when to transmit a CDCF signal. The CDCF transmission unit 121 outputs a CDCF signal in accordance with the command. As described later, each of various CDCF signals is output in a corresponding one of field areas constituting a coexistence region. These CDCF signals will be more specifically described later.

The D/A converter 122 converts the CDCF signal output from the CDCF transmission unit 121 from a digital signal to an analog signal. The amplifier 123 amplifies the CDCF signal, which is an analog signal, output from the D/A converter 122. The LPF 124 limits the band of the CDCF signal amplified by the amplifier 123. When transmitting the CDCF signal under control performed by the control unit 101, the driver 125 sends the CDCF signal output from the LPF 124 to the power line via the coupler 105 and the power-supply connector 104.

The BPF 126 extracts a frequency signal corresponding to the CDCF signal from the power line via the power-supply connector 104 and the coupler 105. The amplifier 127 amplifies the frequency signal extracted by the BPF 126. The A/D converter 128 converts the frequency signal amplified by the amplifier 127 from an analog signal to a digital signal.

The CDCF receiving unit 129 detects a CDCF signal using the frequency signal, which is a digital signal, output from the A/D converter 128. The control unit 101 sends a command to the CDCF receiving unit 129 as to when to receive a CDCF signal and which type of CDCF signal to detect. The CDCF receiving unit 129 supplies information regarding results of a detection operation for detecting the specified type of CDCF signal to the control unit 101. The CDCF receiving unit 129 determines which slot to use in accordance with the details of the received CDCF signal and determines when an idle time is.

The broadcast-wave detector 120 detects a broadcast wave by performing frequency analysis on an output signal output from the A/D converter 118. The broadcast-wave detector 120 performs frequency analysis using, for example, a digital filter or performing, for example, FFT. As described later, the broadcast-wave detector 120 performs a detection operation for detecting a broadcast wave in a period during which no communication signals and no CDCF signals are present on the power line under control performed by the control unit 101. This period is represented by a temporal position. The broadcast-wave detector 120 supplies information regarding results of the detection operation to the control unit 101.

The control unit 101 forms a notch in a frequency band of the communication signal output from the data transmission unit 111, in accordance with the information regarding results of the detection operation supplied form the broadcast-wave detector 120. The frequency band has a predetermined bandwidth in which a broadcast wave is included. The notch formed by the control unit 101 causes the level of the frequency components of the frequency band to be lower. In this case, for example, the control unit 101 controls the data transmission unit 111 to make the subcarrier unavailable, the subcarrier having a frequency band having a predetermined bandwidth in which a broadcast wave is included.

In a coexistence method employed by the PLC modem 100, as shown in FIG. 4, a coexistence region is provided that starts at a time based on the time of a zero crossing point of an alternating voltage. That is, the coexistence region has a start point that starts after an offset time Toffset has passed from the zero crossing point. This coexistence region is provided for every two cycles of the alternating voltage. This coexistence region includes a plurality of field areas. For example, the coexistence region shown in this embodiment includes 11 field areas as shown in FIG. 4. Although an example in which the coexistence region includes 11 field areas is shown, the number of field areas may be smaller or larger than 11.

Figures 5A, 5B:
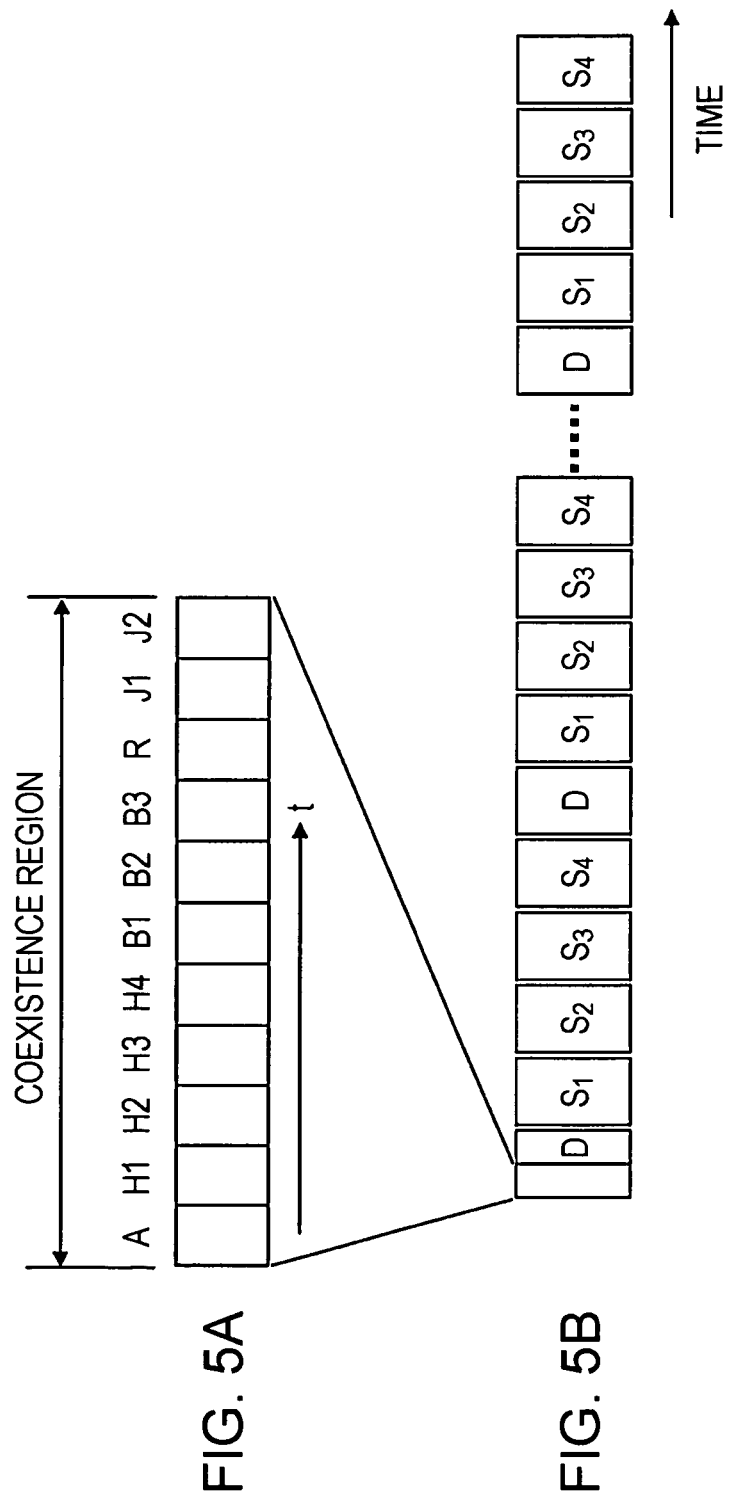
FIGS. 5A and 5B are diagrams illustrating an exemplary structure of fields of a coexistence region and an exemplary structure of a data region between coexistence regions.

FIG. 5A shows an exemplary structure of fields of the coexistence region. The coexistence region includes 11 field areas: an A field, H1 to H4 fields, B1 to B3 fields, an R field, and J1 and J2 fields. Here, a region between coexistence regions is a data region. In the data region, a D slot, which is included in a best-effort data region, and S slots (slots S1 to S4), which are included in a bandwidth-reservation data region, are sequentially and repeatedly provided as shown in FIG. 5B. Data communication is performed using the temporal locations of these slots.

Figures 6A, 6B:
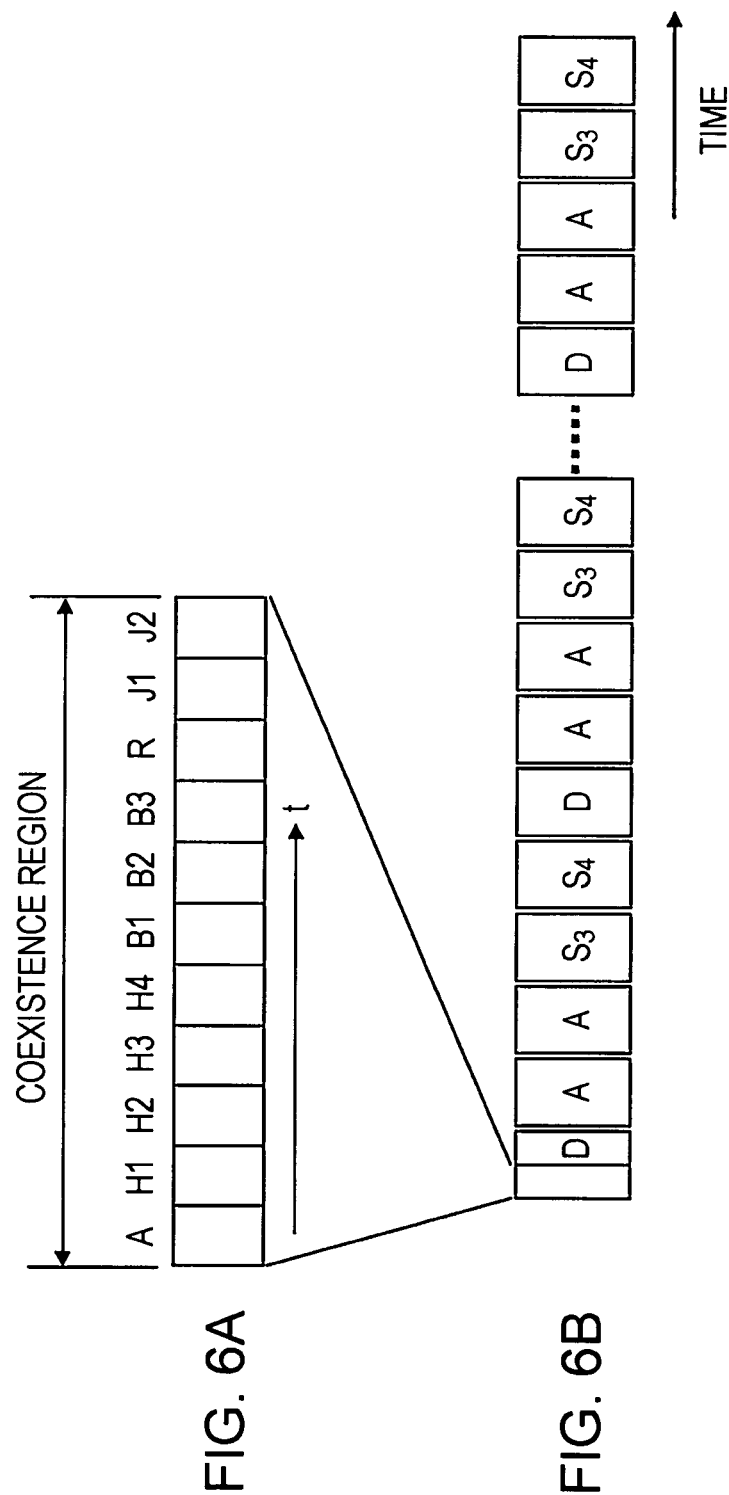
FIGS. 6A and 6B are diagrams illustrating a data region when a CDCF signal is present in an A field and an access system uses the data region.

The CDCF signals output in the fields that constitute a coexistence region will be described. The CDCF signal output in the A field will be a flag to be transmitted when an access system uses a data region. When a CDCF signal is present in the A field, the slots S1 and S2 from among the S slots (the slots S1 to S4), which are included in a bandwidth-reservation data region (see FIG. 5B), become slots A as shown in FIG. 6B. Such slots A are used by an access system. Here, FIG. 6A is the same as the FIG. 5A.

The CDCF signal output in the H1 to H4 fields will be a flag that indicates which slot from among the S slots (the slots S1 to S4) a terminal system should use. For example, when a CDCF signal is present in the H1 field, the terminal system that has output the CDCF signal can reserve and use the slot S1.

The CDCF signals output in the J1 and J2 fields will be a join request in a case in which a system that wants to use an S slot newly joins a network or the system wants to use more slots. A system that detects the CDCF signals output in the J1 and J2 fields releases an S slot that the system has reserved. That is, a system that is going to newly reserve an S slot outputs CDCF signals in the J1 and J2 fields, and waits until one of the H fields (the H1 to H4 fields) changes to be in an idle state. Then, the system outputs the CDCF signal in the H field. Thus, once an H field is in the idle state, the H field will not be reserved until the system that has output CDCF signals in the J1 and J2 fields outputs a CDCF signal in the H field. Such CDCF signals are output at a low frequency in the J1 and J2 fields and transmitted without notice.

The CDCF signal output in the B1 to B3 fields indicates which D slot to use from among D slots or which part of each of the D slots to use when a best-effort system shares the D slots by time to sometimes perform communication before the next CDCF signal is transmitted. For example, when D slots that a best-effort system can use are arranged with a certain time interval therebetween as shown in FIG. 5B, a CDCF signal output in one of the B1 to B3 fields indicates which D slot to use, the D slot being defined by how many fields there are from a coexistence region. Alternatively, each D slot is divided into three: the first one third, the second one third, and the last one third. A CDCF signal output in one of the B1 to B3 fields indicates which one of these three to use for each D slot.

The CDCF signal output in the R field will be a resynchronization signal output from a subject system. The resynchronization signal is used to notify systems with which the subject system hasn't synchronized that the systems should synchronize with the subject system. The period during which a CDCF signal is present in the R field is a period for achieving synchronization. Thus, all the systems stop transmitting communication signals and synchronize with the subject system by referring to CDCF signals output in a coexistence region. All the systems synchronize with each other under normal conditions, whereby the R field is rarely used.

Figure 7:
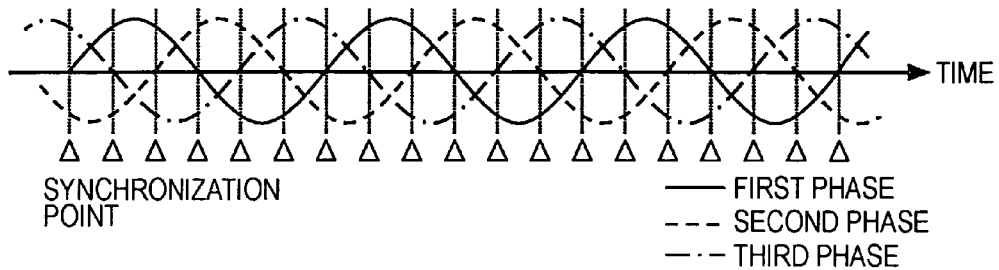
FIG. 7 is a diagram illustrating achievement of synchronization between zero crossing points in a case of three-phase alternating current.

Each of the systems arranges coexistence regions with respect to zero crossing points of an alternating voltage. However, when a coexistence method is used in which a coexistence region is arranged for every certain numbers of zero crossing points, a system that arranges a coexistence region for every zero crossing point does not synchronize with the other systems. Moreover, in a case of three-phase alternating current, zero crossing points are shifted between systems using different phases as shown in FIG. 7 and the systems using different phases may not synchronize with each other. The CDCF signal output in the R field, that is, a resynchronization signal, is used to synchronize these systems with each other.

The operation of the PLC modem 100 shown in FIG. 1 will be described. The operation of the PLC modem 100 when data communication is performed will be described. The control unit 101 supplies transmission data to the data transmission unit 111. This transmission data is data generated by the control unit 101 or data supplied from another device via the Ethernet circuit 102. The data transmission unit 111 performs OFDM modulation processing on the transmission data to generate a communication signal (a transmission signal) having a communication band of 2 MHz to MHz. This communication signal is converted by the D/A converter 112 from a digital signal to an analog signal and amplified by the amplifier 113, and the frequency band of the amplified communication signal is limited by the LPF 114. Then, the data transmission unit 111 sends the resulting signal to the power line via the driver 115, the coupler 105, and the power-supply connector 104.

Moreover, a communication signal (a received signal) extracted from the power line via the power-supply connector 104, the coupler 105, and the BPF 116 is amplified by the amplifier 117 and converted by the A/D converter 118 from an analog signal to a digital signal. Then, the resulting signal is supplied to the data receiving unit 119. The data receiving unit 119 performs OFDM demodulation processing on the communication signal to obtain reception data. This reception data is supplied to the control unit 101.

Next, the operation of the PLC modem 100 when a CDCF signal is transmitted will be described. The CDCF transmission unit 121 receives, from the control unit 101, a command as to which type of CDCF signal to select and when to transmit the CDCF signal. The CDCF transmission unit 121 outputs a CDCF signal (a subcarrier) in a predetermined field area from among the field areas that constitute a coexistence region, in accordance with the command. This CDCF signal is converted by the D/A converter 122 from a digital signal to an analog signal and amplified by the amplifier 123, and the frequency band of the amplified CDCF signal is limited by the LPF 124. Then, the resulting signal is sent to the power line via the driver 125, the coupler 105, and the power-supply connector 104.

Next, the operation of the PLC modem 100 when a CDCF signal is received will be described. A frequency signal corresponding to a CDCF signal is extracted from the power line via the power-supply connector 104, the coupler 105, and the BPF 126. This frequency signal is amplified by the amplifier 127 and converted by the A/D converter 128 from an analog signal to a digital signal. Then, the resulting signal is supplied to the CDCF receiving unit 129. The CDCF receiving unit 129 receives, from the control unit 101, a command as to when to receive a CDCF signal and which type of CDCF signal to detect. The CDCF receiving unit 129 performs a detection operation for detecting a CDCF signal at the specified reception time. Then, the information regarding results of the detection operation is supplied to the control unit 101.

For example, when performing a detection operation for detecting a CDCF signal (a resynchronization signal) in the R field, the CDCF receiving unit 129 determines whether a CDCF signal is present at a temporal location of the following time. In this case, the CDCF receiving unit 129 uses a zero crossing point as a time reference and performs the detection operation for detecting a CDCF signal at a temporal location that is located at a time Tr expressed by Eq. (1) after the time of the zero crossing point.

$$Tr = T\text{offset} + 8 \times T\text{field} + T\text{margin} \quad (1)$$

Figure 8:
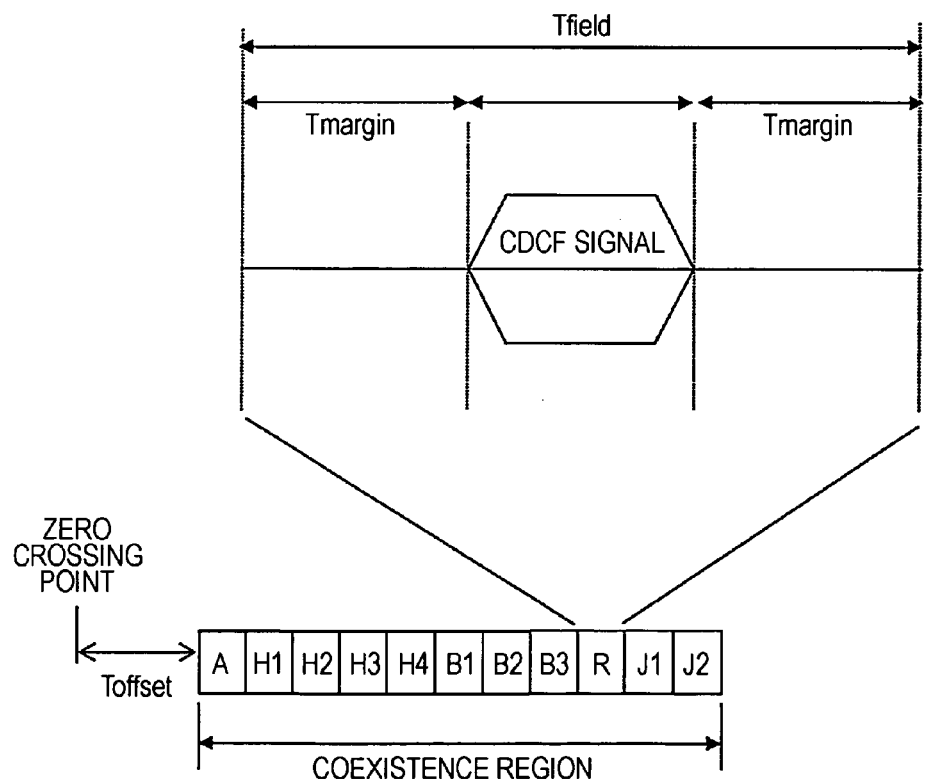
FIG. 8 is a diagram illustrating a way of determining when to perform a detection operation for detecting one of CDCF signals (a CDCF signal in an R field in this example) in a CDCF receiving unit of the PLC modem.

"Toffset" indicates an offset time from a zero crossing point to the start of a coexistence region as shown in FIG. 8. An "8" indicates the number of fields before the R field. "Tfield" indicates the time period of each field. "Tmargin" indicates a margin of each field.

Figure 12:
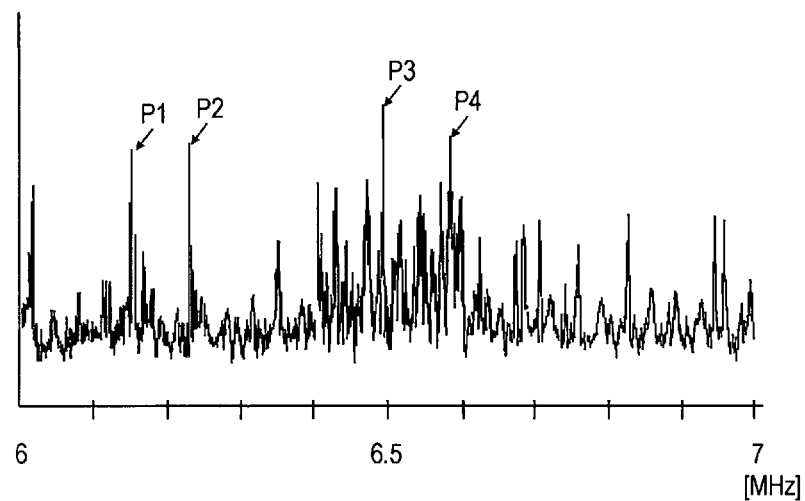
FIG. 12 is a diagram showing an exemplary spectrum, which covers from 6 MHz to 7 MHz, of a signal on a power line.
Figure 13:
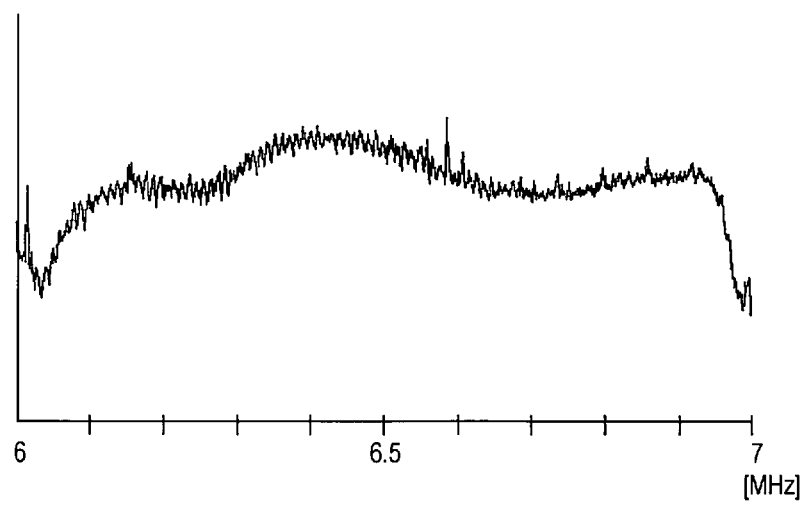
FIG. 13 is a diagram showing a noise spectrum, which covers from 6 MHz to 7 MHz, when a communication signal is sent from a PLC system to the power line.
Figure 14:
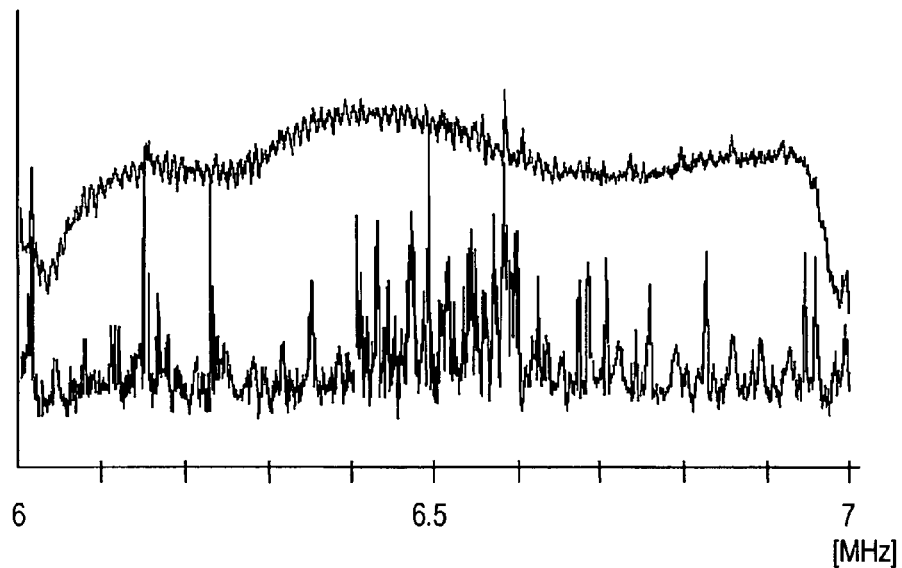
FIG. 14 is a diagram showing both the exemplary spectrum shown in FIG. 12 and the exemplary noise spectrum shown in FIG. 13.
Figure 15:
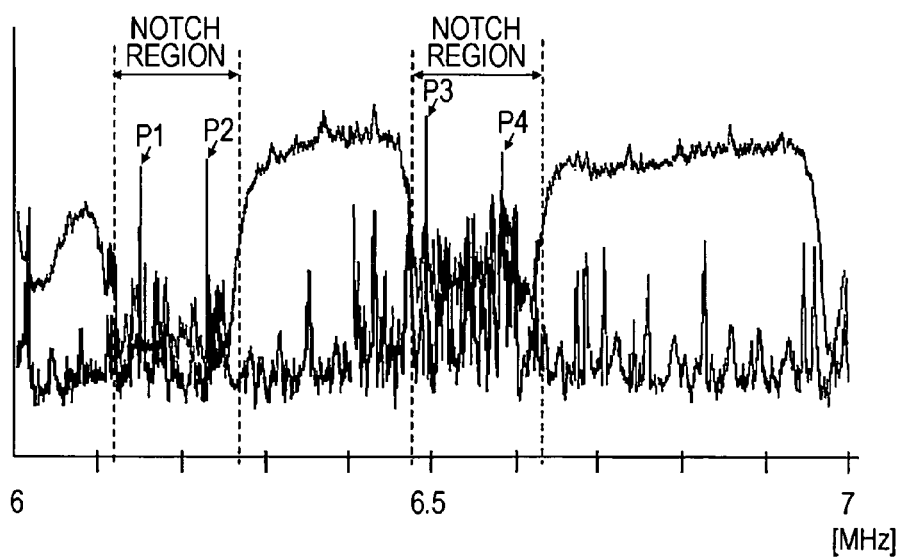
FIG. 15 is a diagram showing an exemplary spectrum in a case in which a notch is formed in a frequency band having a predetermined bandwidth in which broadcast waves are included and short-wave broadcasting is received by someone without interference.

Next, a detection operation for detecting a broadcast wave in the broadcast-wave detector 120 will be described. An output signal output from the A/D converter 118 is supplied to the broadcast-wave detector 120. This output signal is a signal having a communication band extracted from the power line via the power-supply connector 104, the coupler 105, and the BPF 116. The broadcast-wave detector 120 performs frequency analysis on the output signal output from the A/D converter 118, for example, using a digital filter or performing FFT to perform a detection operation for detecting a broadcast wave. For example, when the spectrum of the output signal output from the A/D converter 118 is a spectrum as shown in FIG. 12, broadcast waves denoted by arrows P1 to P4 are detected.

A period for performing the detection operation for detecting a broadcast wave (hereinafter referred to as a "broadcast-wave detection period") in the broadcast-wave detector 120 is set to a period during which no communication signals and no CDCF signals are present on the power line under control performed by the control unit 101. The control unit 101 sets such a broadcast-wave detection period in accordance with the information regarding results of the detection operation for detecting a CDCF signal in each field area of a coexistence region. This indicates that the control unit 101 serves as a detection-period setting unit.

The information regarding results of the detection operation for detecting a broadcast wave in the broadcast-wave detector 120 is supplied to the control unit 101. The control unit 101 forms a notch in a frequency band of a communication signal output from the data transmission unit 111 in accordance with this information regarding results of the detection operation for detecting a broadcast wave, the frequency band having a predetermined bandwidth in which a broadcast wave is included. The notch formed by the control unit 101 causes the level of the frequency components of the frequency band to be lower. In this case, for example, the data transmission unit 111 makes the subcarrier unavailable, the subcarrier having a frequency band having a predetermined bandwidth in which a broadcast wave is included, under control performed by the control unit 101.

Figure 9:
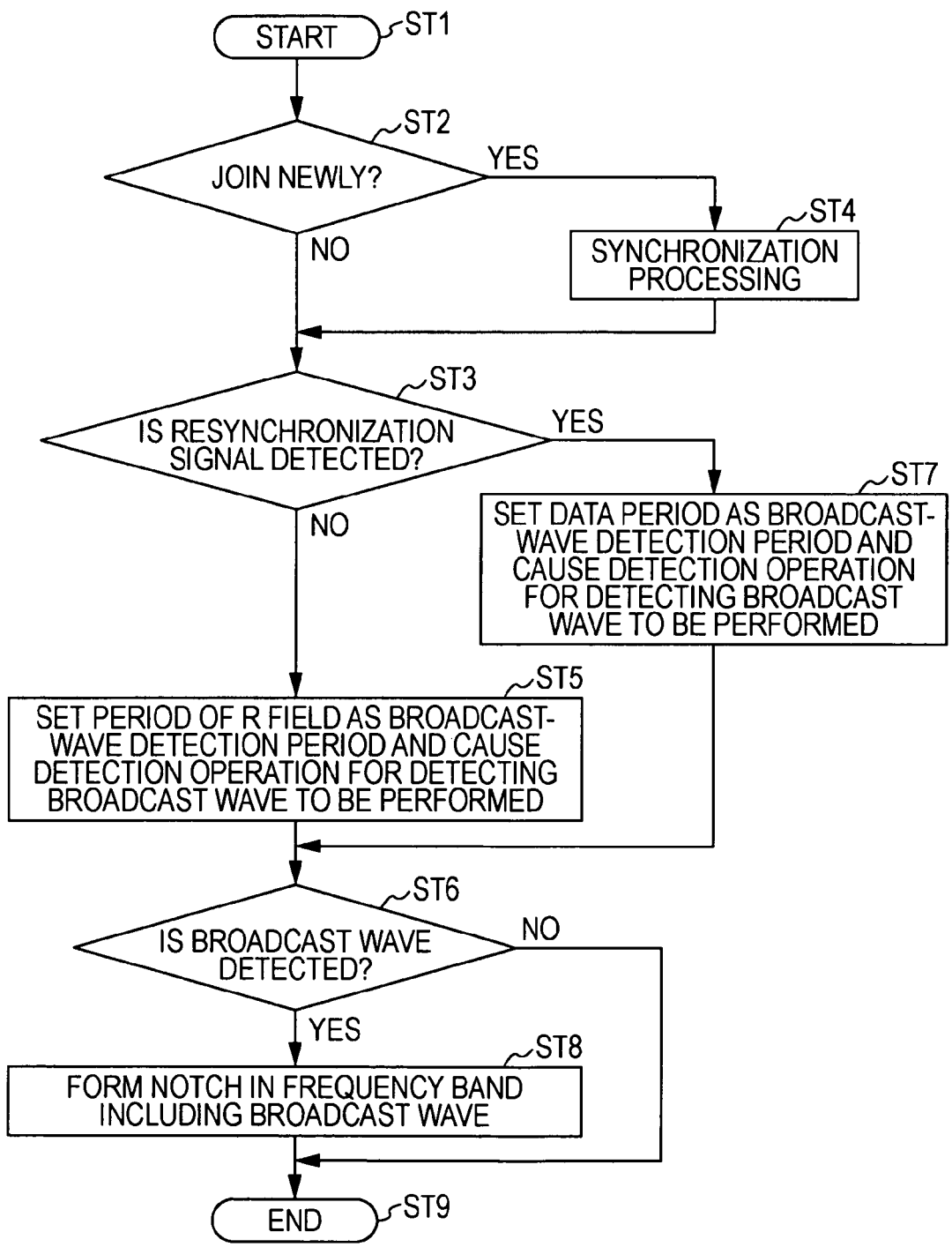
FIG. 9 is a flowchart showing an exemplary processing procedure in which a control unit sets a period for performing a detection operation for detecting a broadcast wave and forms a notch.

FIG. 9 shows an exemplary flowchart of a processing procedure in which the control unit 101 sets a broadcast-wave detection period and forms a notch.

In step ST1, the control unit 101 starts processing, and the procedure proceeds to step ST2. In step ST2, the control unit 101 determines whether a system that includes the control unit 101 (hereinafter referred to as a "subject system") newly joins a network. If the control unit 101 determines that the subject system is already part of the network, the procedure proceeds to step ST3. If the control unit 101 determines that the subject system newly joins the network, the procedure proceeds to step ST4.

In step ST4, the control unit 101 performs processing to achieve synchronization. That is, the control unit 101 causes the subject system to synchronize with other systems that have already been working in the network. The processing to achieve synchronization is performed with reference to a CDCF signal that another system has output in a coexistence region. Alternatively, when no other systems are working in the network, the control unit 101 sets a zero crossing point as a reference of a coexistence region. After processing in step ST4 is performed, the procedure proceeds to step ST3.

In step ST3, the control unit 101 determines whether a resynchronization signal is detected. In this case, the control unit 101 causes the CDCF receiving unit 129 to perform a detection operation for detecting a CDCF signal in the R field of the coexistence region and makes a determination in accordance with information regarding results of the detection operation performed by the CDCF receiving unit 129. If the CDCF receiving unit 129 has not detected a resynchronization signal, in step ST5, the control unit 101 sets the R field of the coexistence region as a broadcast-wave detection period and causes the broadcast-wave detector 120 to perform the detection operation for detecting a broadcast wave in the broadcast-wave detection period. The R field is rarely used under normal conditions in which synchronization has been achieved. Thus, when no CDCF signal is present in the R field, the detection operation for detecting a broadcast wave can be performed in the R field without being affected by a CDCF signal. After processing in step ST5 is performed, the procedure proceeds to step ST6.

If the CDCF receiving unit 129 detects a resynchronization signal in step ST3, the procedure proceeds to step ST7. In step ST7, the control unit 101 sets a data period (the periods of the D slots and the periods of the S slots) as a broadcast-wave detection period, and causes the broadcast-wave detector 120 to perform the detection operation for detecting a broadcast wave in the broadcast-wave detection period. When a CDCF signal is present in the R field of the coexistence region, all the systems working in the network stop sending a communication signal. Thus, in this data period, the detection operation for detecting a broadcast wave can be performed without being affected by communication signals. After processing in step ST7 is performed, the procedure proceeds to step ST6.

In step ST6, the control unit 101 determines whether a broadcast wave is detected. In this case, the control unit 101 determines whether a broadcast wave is detected in accordance with the information regarding results of the detection operation performed by the broadcast-wave detector 120. If the control unit 101 determines that the broadcast wave is detected, the procedure proceeds to step ST8. In step ST8, the control unit 101 controls the data transmission unit 111, and forms a notch in a frequency band in which the broadcast wave is included to reduce the effects of communication signals on the broadcast wave. After processing in step ST8 is performed, the control unit 101 terminates processing in step ST9. On the other hand, if the control unit 101 determines that the broadcast wave is not detected in step ST6, the procedure proceeds to step ST9 and the control unit 101 terminates processing.

Figure 10:
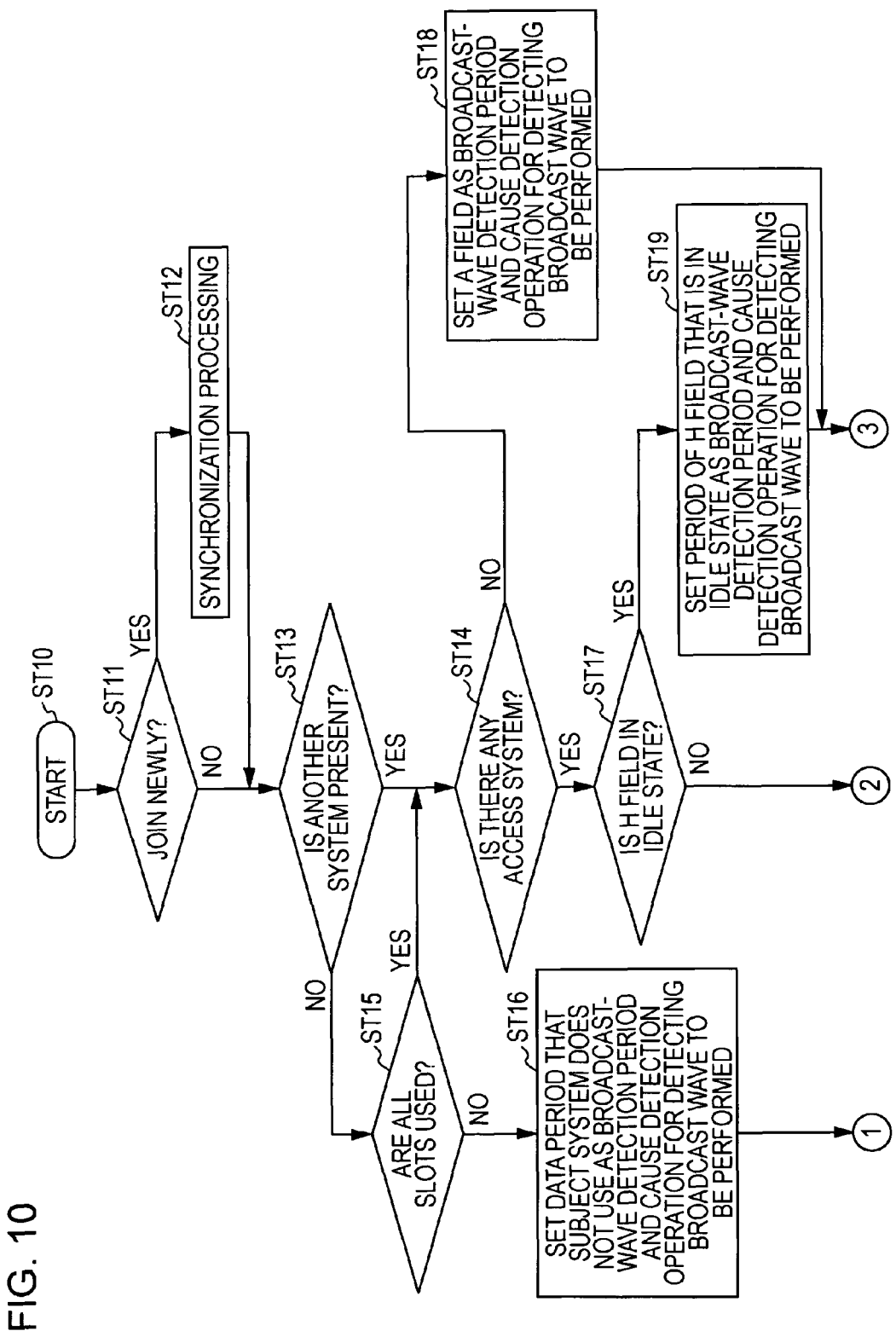
FIG. 10 is part of a flowchart showing another exemplary processing procedure in which the control unit sets a period for performing a detection operation for detecting a broadcast wave and forms a notch.
Figure 11:
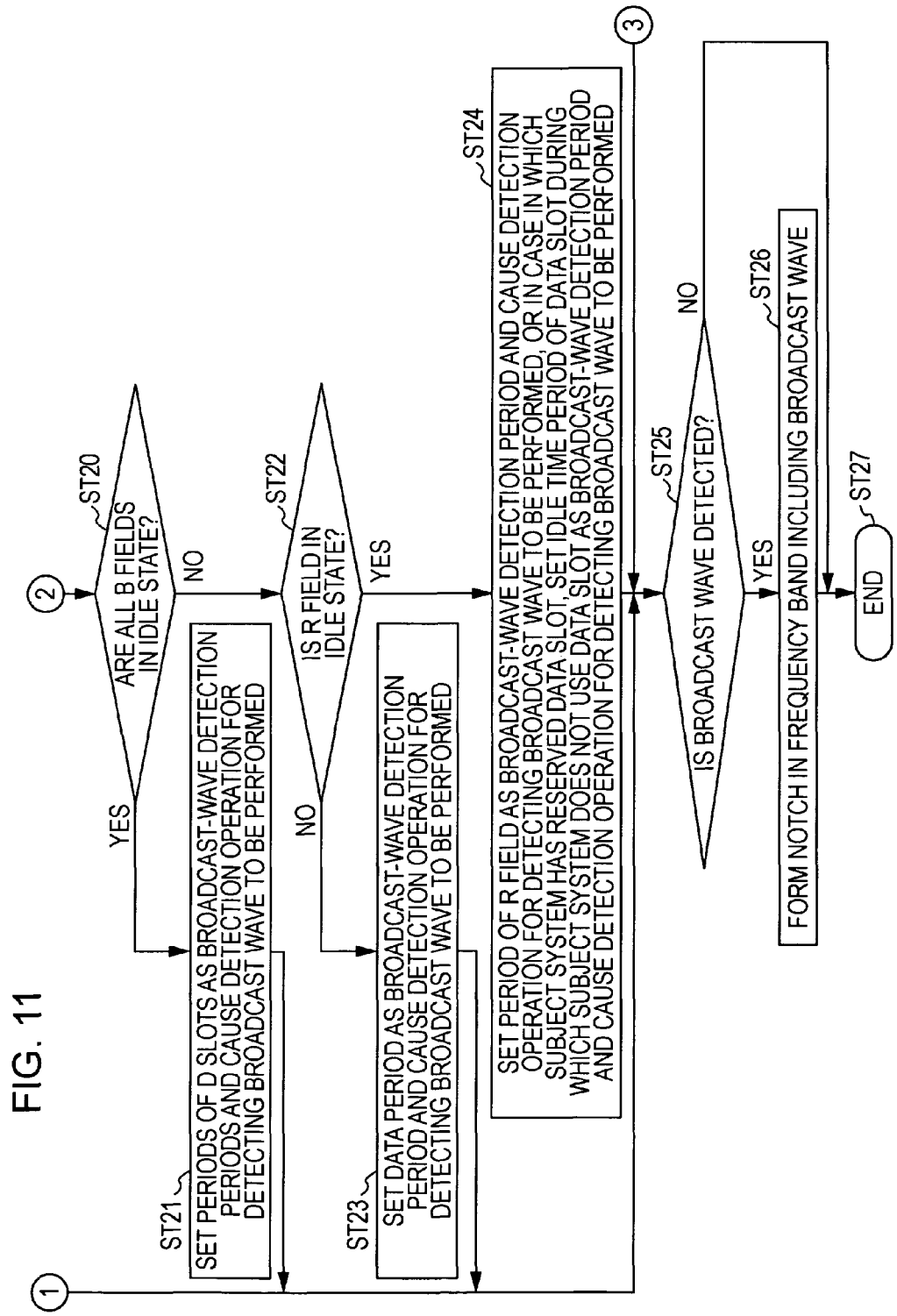
FIG. 11 is the remaining part of the flowchart showing the other exemplary processing procedure in which the control unit sets a period for performing a detection operation for detecting a broadcast wave and forms a notch.

The flowchart shown in FIGS. 10 and 11 shows another exemplary flowchart of a processing procedure in which the control unit 101 sets a broadcast-wave detection period and forms a notch.

In step ST10, the control unit 101 starts processing, and the procedure proceeds to step ST11. In step ST11, the control unit 101 determines whether a subject system, which includes the control unit 101, newly joins a network. If the control unit 101 determines that the subject system is already part of the network, the procedure proceeds to step ST13. If the control unit 101 determines that the subject system newly joins the network, the procedure proceeds to step ST12.

In step ST12, the control unit 101 performs processing to achieve synchronization. That is, the control unit 101 causes the subject system to synchronize with other systems that have already been working in the network. The processing to achieve synchronization is performed with reference to a CDCF signal that another system has output in a coexistence region. Alternatively, when no other systems are working in the network, the control unit 101 sets a zero crossing point as a reference of a coexistence region. After processing in step ST12 is performed, the procedure proceeds to step ST13.

In step ST13, the control unit 101 determines whether the network includes a system other than the subject system. In this case, the control unit 101 causes the CDCF receiving unit 129 to perform a detection operation for detecting a CDCF signal in the A field, the H1 to H4 fields, the B1 to B3 fields, and the like of the coexistence region, and determines whether the network includes a system other than the subject system in accordance with information regarding results of the detection operation.

If the control unit 101 determines that the network does not include a system other than the subject system, the procedure proceeds to step ST15. In step ST15, the control unit 101 determines whether the subject system uses all the slots of a data region. If the control unit 101 determines that the subject system does not use all the slots of the data region, in step ST16, the control unit 101 sets a period or periods that the subject system does not use in the data period as a broadcast-wave detection period or periods, and causes the broadcast-wave detector 120 to perform the detection operation for detecting a broadcast wave in the broadcast-wave detection period or periods. In this case, in the period or periods that the subject system does not use in the data period, the detection operation for detecting a broadcast wave can be performed without being affected by communication signals. After processing in step ST16 is performed, the procedure proceeds to step ST25.

In step ST15, if the control unit 101 determines that the subject system uses all the slots of the data region, the procedure proceeds to step ST14. Moreover, in step ST13, if the control unit 101 determines that the network includes a system other than the subject system, the procedure proceeds to step ST14. In step ST14, the control unit 101 determines whether an access system is present. In this case, the control unit 101 causes the CDCF receiving unit 129 to perform a detection operation for detecting a CDCF signal in the A field of the coexistence region, and determines whether an access system is present in accordance with information regarding results of the detection operation.

If the control unit 101 determines that no CDCF signal is present in the A field of the coexistence region and no access system is present, the procedure proceeds to step ST18. In step ST18, the control unit 101 sets the period of the A field of the coexistence region as a broadcast-wave detection period, and causes the broadcast-wave detector 120 to perform the detection operation for detecting a broadcast wave in the broadcast-wave detection period. In this case, no CDCF signal is present in the A field, and thus the detection operation for detecting a broadcast wave can be performed without being affected by a CDCF signal in the period of the A field. After processing in step ST18 is performed, the procedure proceeds to step ST25.

In step ST14, if the control unit 101 determines that an access system is present, the procedure proceeds to step ST17. In step ST17, the control unit 101 determines whether any of the H fields of the coexistence region is in the idle state. In this case, the control unit 101 causes the CDCF receiving unit 129 to perform a detection operation for detecting a CDCF signal in the H1 to H4 fields of the coexistence region, and determines whether any of the H fields of the coexistence region is in the idle state in accordance with information regarding results of the detection operation.

If the control unit 101 determines that no CDCF signal is present in at least one of the H1 to H4 fields and the at least one of the H1 to H4 fields is in the idle state, the procedure proceeds to step ST19. In step ST19, the control unit 101 sets the period of an H field that is in the idle state or the periods of H fields that are in the idle state from among the H1 to H4 fields as a broadcast-wave detection period or periods, respectively, and causes the broadcast-wave detector 120 to perform the detection operation for detecting a broadcast wave in the broadcast-wave detection period or periods. In this case, the detection operation for detecting a broadcast wave can be performed without being affected by a CDCF signal in the period of the H field that is in the idle state or the periods of the H fields that are in the idle state. After processing in step ST19 is performed, the procedure proceeds to step ST25.

In step ST17, if the control unit 101 determines that all the H fields are not in the idle state, the procedure proceeds to step ST20. In step ST20, the control unit 101 determines whether all the B fields of the coexistence region are in an idle state. In this case, the control unit 101 causes the CDCF receiving unit 129 to perform a detection operation for detecting a CDCF signal in the B1 to B3 fields of the coexistence region, and determines whether all the B fields of the coexistence region are in the idle state in accordance with information regarding results of the detection operation.

If the control unit 101 determines that no CDCF signal is present in all the B1 to B3 fields and all the B1 to B3 fields are in the idle state, the procedure proceeds to step ST21. In step ST21, the control unit 101 sets the periods of the D slots of the data region as broadcast-wave detection periods, and causes the broadcast-wave detector 120 to perform the detection operation for detecting a broadcast wave in the broadcast-wave detection periods. In this case, the D slots for best-effort systems are in an idle state until the next coexistence region starts. Thus, the detection operation for detecting a broadcast wave can be performed without being affected by a communication signal in the periods of the D slots. After processing in step ST21 is performed, the procedure proceeds to step ST25.

In step ST20, if the control unit 101 determines that a CDCF signal is present in at least one of the B fields of the coexistence region, the procedure proceeds to step ST22. In step ST22, the control unit 101 determines whether the R field of the coexistence region is in an idle state. In this case, the control unit 101 causes the CDCF receiving unit 129 to perform a detection operation for detecting a CDCF signal in the R field of the coexistence region, and determines whether the R field of the coexistence region is in the idle state in accordance with information regarding results of the detection operation.

If the control unit 101 determines that a CDCF signal is present in the R field, the procedure proceeds to step ST23. In step ST23, the control unit 101 sets the data period (the periods of the D slots and the periods of the S slots) as a broadcast-wave detection period, and causes the broadcast-wave detector 120 to perform the detection operation for detecting a broadcast wave in the broadcast-wave detection period. When a CDCF signal is present in the R field of the coexistence region, all the systems stop sending a communication signal. Thus, the detection operation for detecting a broadcast wave can be performed in this data period without being affected by a communication signal. After processing in step ST23 is performed, the procedure proceeds to step ST25.

In step ST22, if the control unit 101 determines that no CDCF signal is present in the R field and the R field is in the idle state, the procedure proceeds to step ST24. In step ST24, the control unit 101 sets the period of the R field of the coexistence region as a broadcast-wave detection period, and causes the broadcast-wave detector 120 to perform the detection operation for detecting a broadcast wave in the broadcast-wave detection period. The R field is rarely used under normal conditions in which synchronization has been achieved. Thus, when no CDCF signal is present in the R field, the detection operation for detecting a broadcast wave can be performed in the period of the R field without being affected by a CDCF signal.

Alternatively, in step ST24, if the subject system has reserved a slot of the data region, the control unit 101 sets an idle time period of the slot during which the subject system does not use the slot as a broadcast-wave detection period, and causes the broadcast-wave detector 120 to perform the detection operation for detecting a broadcast wave in the broadcast-wave detection period. In this case, the idle time period of the slot, that is, a time period during which no communication signal is present is set as a broadcast-wave detection period. Thus, the detection operation for detecting a broadcast wave can be performed in this idle time period of the slot without being affected by a communication signal. After processing in step ST24 is performed, the procedure proceeds to step ST25.

In step ST25, the control unit 101 determines whether a broadcast wave is detected. In this case, the control unit 101 determines whether a broadcast wave is detected in accordance with information regarding results of the detection operation performed by the broadcast-wave detector 120. If the control unit 101 determines that a broadcast wave is detected, the procedure proceeds to step ST26. In step ST26, the control unit 101 controls the data transmission unit 111, and forms a notch in a frequency band in which the broadcast wave is included to reduce the effects of communication signals on the broadcast wave. After processing in step ST26 is performed, the control unit 101 terminates the processing procedure in step ST27. If the control unit 101 determines that a broadcast wave is not detected in step ST25, the procedure proceeds to step ST27 and the control unit 101 terminates the processing procedure.

Here, the flowchart shown in FIGS. 10 and 11 shows an exemplary order of determination steps such as steps ST13, ST14, ST17, ST20, and ST22. The order of such determination steps may be different from the order shown in the flowchart of FIGS. 10 and 11.

As described above, in the PLC modem 100 shown in FIG. 1, a detection period during which the broadcast-wave detector 120 performs the detection operation for detecting a broadcast wave is set by the control unit 101 in accordance with information regarding results of the detection operation for detecting a CDCF signal in each of the fields of a coexistence region. Thus, the detection period during which the broadcast-wave detector 120 performs the detection operation for detecting a broadcast wave is set to a period during which no communication signals and no CDCF signals (coexistence signals) are present on the power line. Thus, the broadcast-wave detector 120 can detect a broadcast wave with high accuracy without being affected by communication signals and CDCF signals. Moreover, the broadcast wave can be detected without stopping data communication, whereby the efficiency of communication is not reduced.

Here, in the above-described embodiment, OFDM modulation, which is a multi-carrier scheme, is employed as a modulation scheme. However, embodiments of the present invention may employ other modulation schemes including, for example, a spread spectrum method as well.

Moreover, the above-described embodiment employs the PLC modem 100 as a unit that sends and receives data. However, embodiments of the present invention may employ an electric appliance provided with a PLC modem, such as a television set, a personal computer, and the like as well.

Moreover, a communication device according to an embodiment of the present invention may not be provided with both a data sending part and a data receiving part, and may be provided with, for example, just a data sending part.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
a data communication unit that sends a communication signal to a power line, the communication signal being obtained by at least modulating transmission data;
a zero-crossing-point detector that detects a zero crossing point of an alternating voltage applied from the power line;
a coexistence-signal transmission unit that sends a coexistence signal to the power line in a coexistence region that starts at a time based on the zero crossing point detected by the zero-crossing-point detector, the coexistence signal having information for allowing a plurality of systems to be present on the power line;
a coexistence-signal receiving unit that detects the coexistence signal from the power line in the coexistence region;
a detection-period setting unit that sets a detection period for performing a detection operation for detecting a broadcast wave in accordance with the coexistence signal detected by the coexistence-signal receiving unit; and
a broadcast-wave detector that detects a broadcast wave by performing frequency analysis on a signal on the power line in the detection period set by the detection-period setting unit,
wherein the coexistence region includes a plurality of field areas, and
wherein the coexistence-signal receiving unit performs detection based on an offset from a zero-crossing-point of the alternating voltage and a margin between field areas of the coexistence region.

2. The communication device according to claim 1, wherein the detection-period setting unit sets a period during which no coexistence signal and no communication signal are present as the detection period in accordance with the presence or absence of the coexistence signal in each of the field areas.

3. The communication device according to claim 2, wherein the field areas include a first field area in which a coexistence signal can be present that is used to notify a system that does not synchronize with a subject system that the system should synchronize with the subject system, and
when no coexistence signal is present in the first field area, the detection-period setting unit sets the period of the first field area as the detection period.

4. The communication device according to claim 2, wherein the field areas include a first field area in which a coexistence signal can be present that is used to notify a system that does not synchronize with a subject system that the system should synchronize with the subject system, and
when a coexistence signal is present in the first field area, the detection-period setting unit sets the period of a data region between the coexistence region and the next coexistence region as the detection period.

5. The communication device according to claim 2, wherein a data region between the coexistence region and the next coexistence region includes a plurality of slots that constitute a bandwidth-reservation data region,
the field areas include a plurality of second field areas, in each of which a coexistence signal can be present that indicates that a corresponding one of the slots that constitute the bandwidth-reservation data region is used, and
when the second field areas include a second field area in which no coexistence signal is present and that is in an idle state, the detection-period setting unit sets the period of the second field area as the detection period.

6. The communication device according to claim 2, wherein when no system other than a subject system is present, the detection-period setting unit sets a period that is not used by the subject system as the detection period.

7. The communication device according to claim 2, wherein a data region between the coexistence region and the next coexistence region includes a plurality of slots that constitute a best-effort data region,
the field areas include a plurality of third field areas in which a coexistence signal can be present that indicates which one of or which part of each of the slots that constitute the best-effort data region is used, and
when no coexistence signal is present in any of the third field areas, the detection-period setting unit sets the period of the slots that constitute the best-effort data region as the detection period.

8. The communication device according to claim 2, wherein the field areas include a fourth field area in which a coexistence signal is present when an access system is working, and
when no coexistence signal is present in the fourth field area, the detection-period setting unit sets the period of the fourth field area as the detection period.

9. The communication device according to claim 1, wherein a data region between the coexistence region and the next coexistence region includes a plurality of slots that constitute the data region,
the coexistence region includes a field area in which a coexistence signal can be present that indicates that a slot from among the slots is used, and
in a case in which a subject system has reserved a slot from among the slots, the detection-period setting unit sets a time period of the slot during which the subject system is not using the slot as the detection period.

10. The communication device according to claim 1, wherein when sending the communication signal to the power line, the data communication unit reduces the level of a frequency component of a frequency band of the communication signal, the frequency band having a predetermined bandwidth in which the broadcast wave detected by the broadcast-wave detector is included.

11. The communication device according to claim 10, wherein a modulation scheme performed on the communication signal is a multi-carrier modulation scheme, and
the data communication unit makes a subcarrier unavailable, the subcarrier having a frequency band having a predetermined bandwidth in which the broadcast wave detected by the broadcast-wave detector is included, to reduce the level of a frequency component of the frequency band having the predetermined bandwidth.

12. A method for detecting a broadcast wave, the method being performed by a communication device that includes
- a data communication unit that sends a communication signal to a power line, the communication signal being obtained by at least modulating transmission data,
- a zero-crossing-point detector that detects a zero crossing point of an alternating voltage applied from the power line,
- a coexistence-signal transmission unit that sends a coexistence signal to the power line in a coexistence region that starts at a time based on the zero crossing point detected by the zero-crossing-point detector, the coexistence signal having information for allowing a plurality of systems to be present on the power line, and
- a coexistence-signal receiving unit that detects the coexistence signal from the power line in the coexistence region, the method comprising the steps of:

setting a detection period for performing a detection operation for detecting a broadcast wave in accordance with the coexistence signal detected by the coexistence-signal receiving unit; and detecting a broadcast wave by performing frequency analysis on a signal on the power line in the detection period set in the step of setting the detection period, wherein the coexistence region includes a plurality of field areas, and wherein the coexistence-signal receiving unit performs detection based on an offset from a zero-crossing-point of the alternating voltage and a margin between field areas of the coexistence region.

* * * * *